Feb. 17, 1931. E. C. SCHMELZKOPF 1,792,713
SIGNAL SWITCH FOR AUTOMOBILES
Filed Nov. 28, 1928
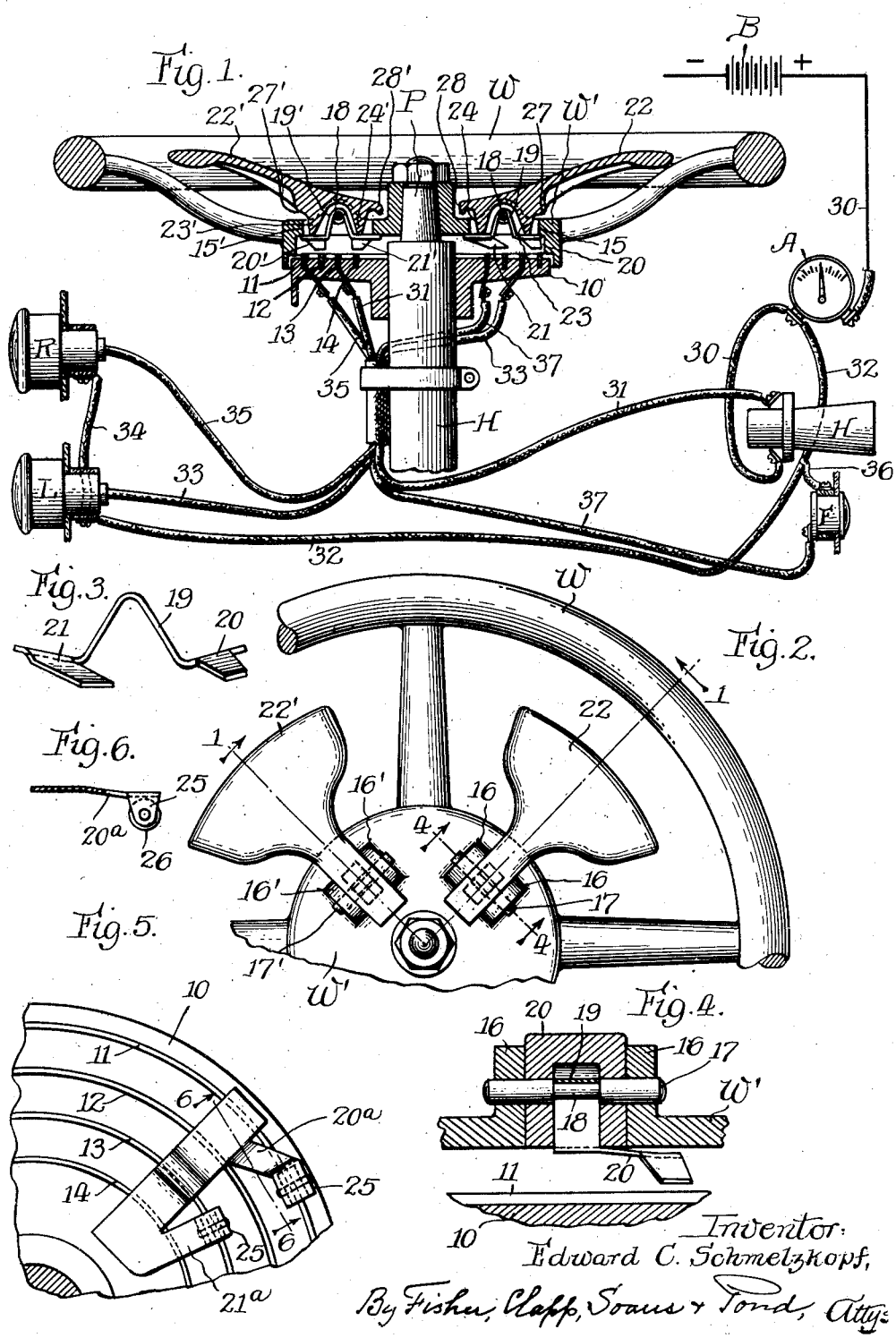
Inventor:
Edward C. Schmelzkopf,
By Fisher, Clapp, Soans & Pond, Attys.

Patented Feb. 17, 1931

1,792,713

UNITED STATES PATENT OFFICE

EDWARD C. SCHMELZKOPF, OF MADISON, WISCONSIN

SIGNAL SWITCH FOR AUTOMOBILES

Application filed November 28, 1928. Serial No. 322,417.

This invention relates to the art of automobile signal devices, having reference more particularly to those of the electric type. Electric signalling devices employing a group of concentric rings mounted in an insulation block secured on the housing of the steering pillar or post and wired to right, left and stop signal lamps, in association with circuit make and break contact terminals and manually operable actuating mechanism therefor mounted on the steering wheel are known, and my present invention belongs to this specific type.

One object of the present invention is to provide a signal device of the character above noted wherein the circuit may be closed not only without removing the hand from the steering wheel but without relaxing the grip of the hand on the rim of the wheel, thereby enabling the driver to operate a signal while maintaining perfect steering control. Another object is to provide a construction wherein a single contact terminal control lever may be used to close the circuit of either of two signal devices, being normally maintained in neutral position, thus simplifying the structure and reducing the number of contact actuating members on the steering wheel. Another object is to provide an improved lever controlling spring adapted to permit of the contact terminals being made in one piece therewith, thus further contributing to simplicity of structure and economy of cost.

Still other objects and advantages of the invention will be apparent to persons skilled in the art as the same becomes better understood by reference to the following detailed description, taken in connection with the accompanying drawings in which I have illustrated one practical embodiment of the principle of the invention, and wherein—

Fig. 1 is a vertical section on the line 1—1 of Fig. 2, through the steering wheel and the circuit make and break devices associated therewith, showing also diagrammatically a number of signal devices and the wiring arrangement;

Fig. 2 is a plan view of the steering wheel and control levers, with parts broken away;

Fig. 3 is a perspective detail of the combined lever control spring and contact terminal carrier;

Fig. 4 is an enlarged section on the line 4—4 of Fig. 2;

Fig. 5 is a fragmentary plan view of the contact ring plate and one of the lever control springs, showing roller contact terminals associated with the latter;

Fig. 6 is a sectional detail on the line 6—6 of Fig. 5.

Referring to the drawings, W designates the steering wheel, P the pillar or post, and H the post housing or sleeve of an automobile. Non-rotatably mounted on the upper end of the housing H is an insulation plate 10, and embedded in the top surface of plate 10 is a group of contact rings, four such rings 11, 12, 13 and 14 being shown in the present instance. These rings are all concentric with each other and with the axis of post P.

The hub W' of the steering wheel is formed with a pair of radial slots 15 and 15' on the right and left sides thereof respectively, and on the sides of said slots with apertured bearing lugs 16 and 16' for pivot pins 17 and 17'. Each of these pivot pins has a reduced central portion shown at 18 in Fig. 4.

Suspended on the reduced portions 18 of the pivot pins 17 and 17' are a pair of spring contact carriers 19 and 19' of inverted V shape extending through the respective slots 15 and 15', the lower ends of the limbs of carrier 19 having laterally extending downwardly inclined contact terminals 20 and 21 respectively overlying the contact rings 11 and 13, and the lower ends of the limbs of carrier 19' having similar contact terminals 20' and 21' respectively, overlying the contact rings 12 and 14. These contact carriers and their contact terminals are preferably made from a single strip of spring metal cut and bent to shape; and it may here be noted that when each carrier is mounted on its pivot pin the sides of the carrier are put under transverse compression whereby the rear ends of the contact terminals thereof are in pressure contact with the under side of the hub of the steering wheel, thus holding the contact terminals separated from the contact rings, and normally maintaining the contact control lever (hereinafter described) in neutral position.

22 and 22' designate a pair of duplicate control levers, each of which, as clearly shown in Fig. 4, is forked on its under side to straddle the limbs of the contact carrier and apertured to receive the pivot pin. It may here be noted that by mounting the carrier 19 or 19' on a reduced central portion of the pivot pin, the latter is locked against escape from its bearings, the pin, however, being removable endwise by lifting the contact carrier out of the reduced portion of the pin. On the under side of each lever and disposed on opposite sides of the pivot pin are depending lugs that function, when the lever is rocked in one direction or the other, to depress the contact terminals into contact with their respective rings, the lugs on lever 22 being identified by 23 and 24, and the corresponding lugs on lever 22' by 23' and 24'. By reference to Fig. 2 it will be seen that the levers 22 and 22' extend substantially radially from the hub toward the rim of the steering wheel and are preferably widened at their outer ends in the form of wings to afford broad thumb and finger contact therewith.

In Figs. 5 and 6 I show a slight modification of the contact terminals, wherein terminals such as 20ᵃ and 21ᵃ are formed with depending forks 25 in which are journaled rollers 26 adapted to afford rolling contact, instead of sliding friction contact, with the rings.

The particular number and character of signals employed and the particular system of wiring used are both immaterial to the invention, but, for illustrative purposes, I have shown right and left direction indicating lamps designated by R and L respectively, a horn H, and a special lamp, such as might be used on a fire department car, designated by F, all of these being insulated from the car frame. From the positive pole of the battery B a circuit wire 30 extends to and through the ammeter A to one side of the horn H, and from the other side of the horn a wire 31 leads to the contact ring 13. A branch 32 of wire 30 leads to one terminal of the lamp L, and from the other terminal of said lamp a wire 33 leads to the contact ring 12. A continuation 34 of wire 32 leads to one terminal of the lamp R, and from the other terminal of said lamp a wire 35 leads to the contact ring 11. A branch 36 of wire 32 leads to one terminal of the special lamp F, and from the other terminal of said lamp a wire 37 leads to the contact ring 14. The negative pole of the battery and the contact springs 19 and 19' are grounded on the frame.

In manipulating the above described device, if the driver is about to make a right turn, he depresses lever 22 by the thumb of his right hand, which closes a circuit through lamp R. If he is about to turn left, he depresses lever 22' by the thumb of his left hand, which closes a circuit through lamp L. To sound the horn H he raises lever 22 by one finger of his right hand. And to light the special lamp F he raises lever 22' by one finger of his left hand. And it is to be noted that all of these manual operations can be performed by the driver not only without removing either hand from the steering wheel, but without even slackening the hand grip on the rim of the wheel. The vehicle is thus maintained under the complete and uninterrupted steering control of the driver during the giving of the signals. This highly advantageous result is obtained mainly by the described location of the lever on the steering wheel and the extension of the outer end of the lever to a point adjacent to the inner periphery of the wheel and widening said outer end so that it can be rocked downwardly and upwardly by mere thumb and finger pressure, without releasing or even slackening the grip of the hand on the wheel rim. It will also be observed that a single lever is capable of operating two distinct signal elements, and that, after the lever has been actuated in either direction, it is automatically restored to neutral position and maintained therein until again actuated.

The extent of down swing of lever 22 is limited by a stop 27 on the under side of the lever striking the top of the wheel hub, and the extent of up swing of the lever is limited by a stop 28 on the inner end of the lever striking the top of the wheel hub. Similar stops 27' and 28' on lever 22' limit the down and up movements of the latter in the same way. The initial part of the circuit-closing movement of the lever compresses the limbs of the contact carrier toward each other until the contact terminal touches the contact ring with which it cooperates, and the remaining part of said lever movement flexes the contact terminal itself until the lever stops come into play, thus insuring perfect contact.

Any circuit can, of course, be closed while the steering wheel is being turned; but, as to the right and left direction-indicating signals, good practice requires that these signals be given before the driver starts to make the turn, and this can be done with my device. In this respect it is sharply distinguished from that class of direction-indicating signals wherein the circuit of the signal lamp is closed by a turning movement of the steering wheel. Such signals are flashed too late to be effective.

As above stated, the special signal elements employed, and the special system of wiring used are entirely optional and in nowise limiting of the present invention; the latter being concerned mainly with the means for controlling the circuits in a safe, convenient and handy manner. In other respects also the structural details shown and described may be more or less varied without involving any departure from the substance of the invention as defined in the following claims.

I claim—

1. In a signal switch of the character described, the combination with the steering wheel, wheel post, and post housing of a motor vehicle, of an insulation plate mounted on said housing, a pair of spaced contact rings mounted on said plate concentric with the axis of said post, a pair of spring-retracted contact terminals mounted on said wheel opposite said rings respectively, a lever pivoted on said wheel at a point between said contact terminals and extending to a point adjacent to the rim of the wheel, said lever, when rocked in one direction, operating to close a circuit between one of said terminals and one of said rings, and when rocked in the opposite direction operating to close a circuit between the other terminal and the other ring.

2. In a signal switch of the character described, the combination with the steering wheel, wheel post, and post housing of a motor vehicle, of an insulation plate mounted on said housing, a pair of spaced contact rings mounted on the upper side of said plate concentric with the axis of said post, a pair of spring-retracted contact terminals mounted on the hub of said wheel above said rings respectively, a lever pivoted on said hub at a point between said contact terminals and extending to a point adjacent to the rim of the wheel, and depending lugs on said lever operative to close circuits between said contact terminals and rings respectively when said lever is rocked in opposite directions.

3. In a signal switch of the character described, the combination with the steering wheel, wheel post, and post housing of a motor vehicle, of an insulation plate mounted on said housing, a pair of spaced contact rings mounted on the upper side of said plate concentric with the axis of said post, an inverted V-shaped spring mounted at its upper end on said wheel and carrying contact terminals on the lower ends of its limbs respectively overlying said rings, a lever pivoted on said wheel at a point between said terminals and extending to a point adjacent to the rim of the wheel, and lugs on the lower side of said lever adapted to depress said terminals into contact with said rings respectively when said lever is rocked in opposite directions.

4. In a signal switch of the character described, the combination with a steering wheel having a slotted hub, a wheel post, and a post housing, of an insulation plate mounted on said housing, a pair of spaced contact rings mounted on the upper side of said plate concentric with the axis of said post, a pivot pin mounted on said hub crosswise of the slot of the latter, an inverted V-shaped spring suspended on said pin and extending through said slot and carrying contact terminals on the lower ends of its limbs respectively overlying said rings, a lever pivoted on said pin, and depending lugs on said lever respectively overlying said terminals; both of said terminals in the neutral position of said lever lying in contact with the under side of said hub.

5. In a signal switch of the character described, the combination with a steering wheel having a slotted hub, a wheel post, and a post housing, of an insulation plate mounted on said housing, a pair of spaced contact rings mounted on the upper side of said plate concentric with the axis of said post, a pivot pin mounted on said hub crosswise of the slot of the latter, an inverted V-shaped spring suspended on said pin and extending in a transversely compressed state through said slot and carrying flexible contact terminals on the lower ends of its limbs respectively overlying said rings, a lever pivoted on said pin, depending lugs on said lever respectively overlying said terminals, both of said terminals in the neutral position of said lever lying in pressure contact with the under side of said hub, and stops on said lever cooperating with said hub to limit the extent of flexing movement imparted to said spring and terminals.

6. In a signal switch of the character described, the combination with a steering wheel, and electric circuits having normally open contact terminals, of a circuit-closing lever pivoted between its ends on said wheel and lying substantially radially of the latter and formed with a widened wing-like outer end disposed adjacent to the inner periphery of the wheel rim and adapted to be rocked downwardly by the thumb to close one circuit and upwardly by a finger to close another circuit without relaxing the grip of the hand on the wheel rim.

EDWARD C. SCHMELZKOPF.